United States Patent [19]

Nielsen, Jr.

[11] 4,256,335
[45] Mar. 17, 1981

[54] POSITIVE LOCKING TERMINAL BUSHINGS FOR FLEXIBLE TUBING

[76] Inventor: Anker J. Nielsen, Jr., 410 Bailey Rd., Holden, Mass. 01520

[21] Appl. No.: 930,930

[22] Filed: Aug. 4, 1978

Related U.S. Application Data

[63] Continuation of Ser. No. 799,211, May 23, 1977, abandoned.

[51] Int. Cl.³ ............................................. F16L 33/18
[52] U.S. Cl. .................................. 285/250; 285/348; 285/382.7
[58] Field of Search ............... 285/249, 250, 382.7, 285/323, 15, 348

[56] References Cited

U.S. PATENT DOCUMENTS

| | | | |
|---|---|---|---|
| 2,470,538 | 5/1949 | Wolfram et al. | 285/249 |
| 3,409,314 | 11/1968 | Roe | 285/382.7 X |
| 3,545,794 | 12/1970 | Wise | 285/248 |
| 3,596,933 | 8/1971 | Luckenbill | 285/249 X |
| 3,700,268 | 10/1972 | Nielsen, Jr. | 285/249 |
| 3,814,466 | 6/1974 | Leopold, Sr. | 285/55 |
| 3,836,700 | 9/1974 | Niemeyer | 285/248 X |
| 3,980,325 | 9/1976 | Robertson | 285/249 |
| 4,062,572 | 12/1977 | Davis | 285/250 X |

*Primary Examiner*—Thomas F. Callaghan
*Attorney, Agent, or Firm*—Robert K. Randall

[57] ABSTRACT

This device is an adapter for joining non-threadable flexible tubing to other piping in both fluid-tight and mechanically positive relation. It has serrated chuck jaws encircling the tubing which grip and depress the wall of the tubing into a peripheral hollow in a supporting sleeve within the end of the tubing, when relative rotation is effected between the body of the adapter and a bushing threaded thereinto and surrounding the tubing. A gasket is pressed into sealing relation with the tubing and the adapter.

1 Claim, 9 Drawing Figures

POSITIVE LOCKING TERMINAL BUSHINGS FOR FLEXIBLE TUBING

This is a continuation of application Ser. No. 799,211, filed May 23, 1977, and now abandoned.

This invention relates to devices for joining non-threadable thin-walled flexible and deformable tubing or pipe to further fluid-conducting means such as rigid pipe or fittings in a manner that will be both fluid-tight and mechanically fixed and positive.

Such connecting means are widely used in the repair or replacement of existing iron service pipe lines which require renewal, this being effected by running soft copper or plastic tubing through the old iron pipe as a conduit. In such usage, especially in the case of gas pipes, the delivery end of the tubing must be hermetically sealed to the interior of the iron pipe or fitting, to prevent back-flow of gas between the two pipes, with eventual escape through leaks or at the ends of the iron pipe.

An example of such device is that of my prior U.S. Pat. No. 3,700,268, issued Oct. 24, 1972.

The present invention is an improvement on the adapter or terminal bushing of such patent, and is aimed to increase the certainty of the gripping and sealing action upon the flexible tubing while reducing the torque and hence the physical effort required in applying the adapter; and also to avoid the twisting of the tubing in so doing, all without sacrifice of the advantages of the patented structure.

An illustrative embodiment of the invention is shown in the accompanying drawings, in which.

Figure 1:
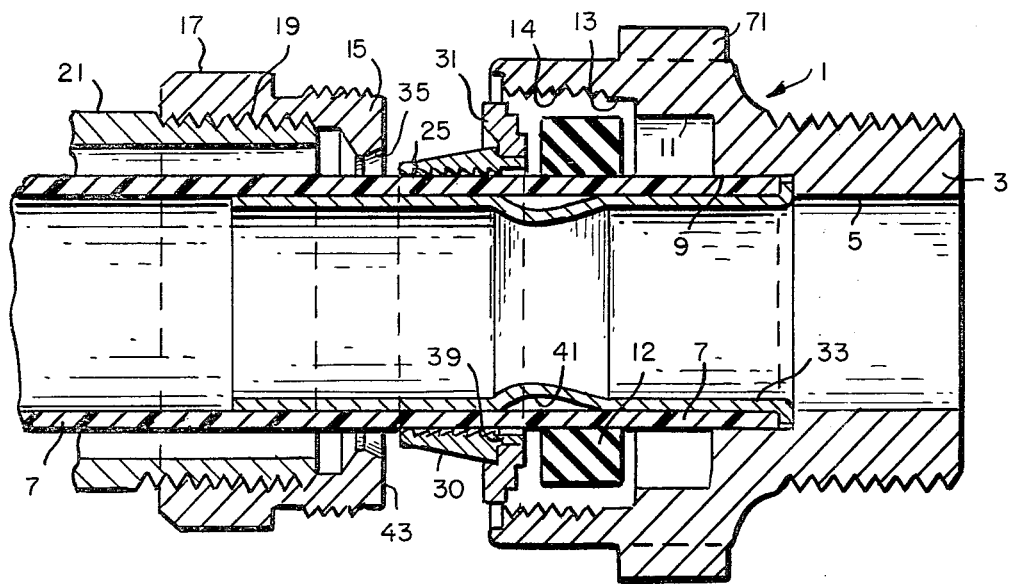
FIG. 1 shows in axial section the end portions of an iron pipe and a flexible tubing protruding therefrom, with the parts forming the novel adapter in place thereon but not tightened.
Figure 2:
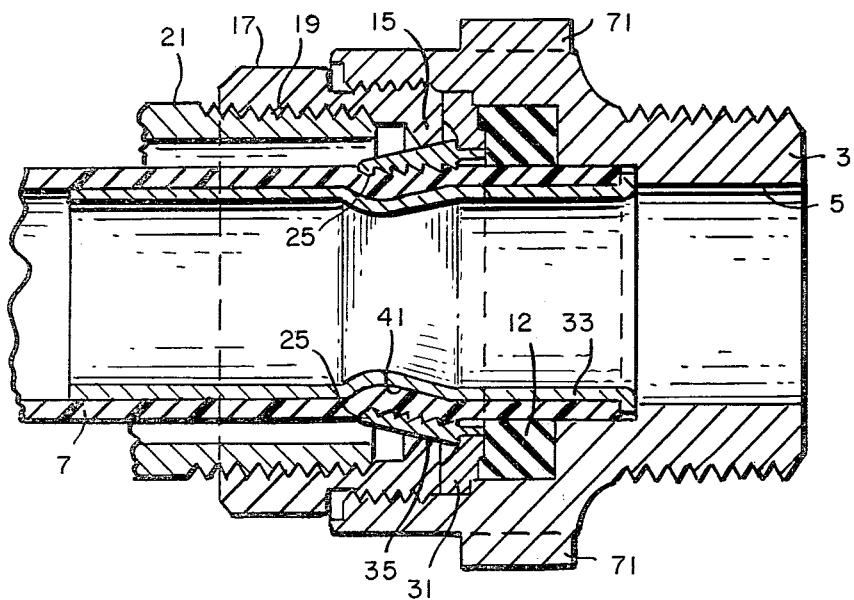
FIG. 2 shows the same parts tightened into fixed working relation.
Figure 4:
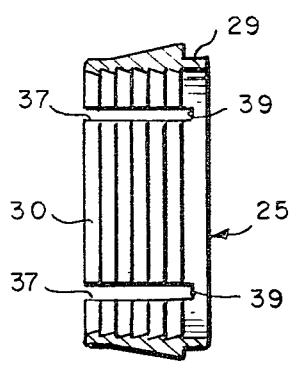
Figure 3:
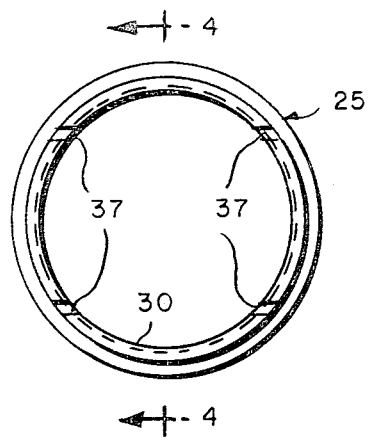
FIG. 3 is an axial or end view, FIG. 4 a diametric section, and FIG. 5 a detail of the chuck element having the jaws which grip the tubing.

Having reference to the drawings, the body portion 1 has a hub 3 with an external pipe thread of standard or any desired pitch and an internal bore of five different diameters. The portion 5 is of the same diameter as that of the flexible tubing 7. Portion 9 slightly exceeds the outside diameter of the tubing. Portion 11 fits the diameter and initial thickness of the sealing gasket 12 for which it forms the seat. Portion 13 is internally threaded at 14 to receive the male thread on the hub 15 of a bushing 17 internally threaded to fit on the threaded end 19 of the rigid pipe 21.

Figure 5:
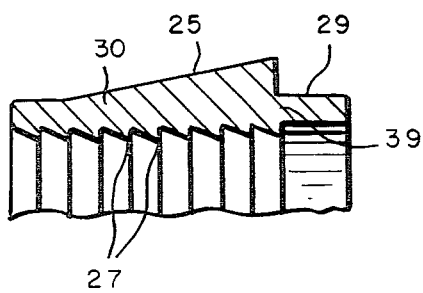

To grip and hold the tubing there is provided a metalic ferrule 25, FIGS. 1, 3, 4, and 5, of frusto-conical and interiorly cylindrical shape and interior dimension larger than that of the tubing and of smooth conical exterior form, with its wall cut into segments and its interior surface serrated, grooved or threaded coarsely in ratchet manner as shown in fragmentary section in FIG. 5 to form peripheral teeth or barbs 27 having a rake toward the large end of the cone.

Figures 6, 7:
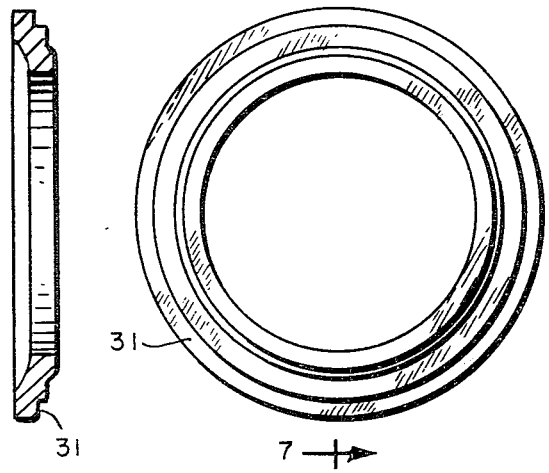
FIGS. 6 and 7 are respectively face and sectional views of the compression ring which stresses the chuck jaws and sealing gasket.
Figure 8:
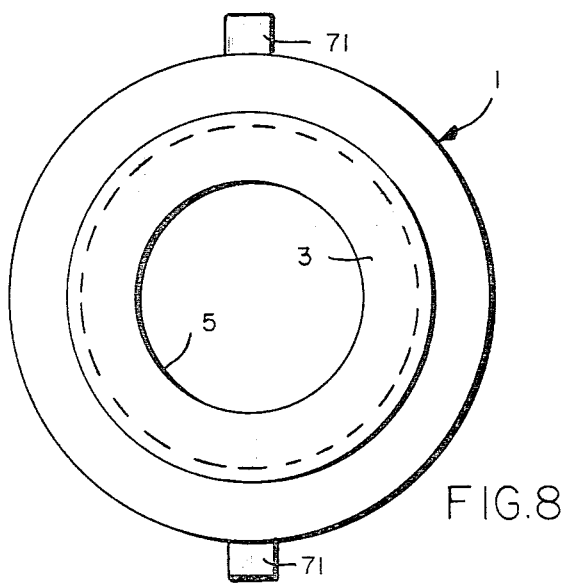
FIG. 8 is an end view of the body portion of the adapter.
Figure 9:
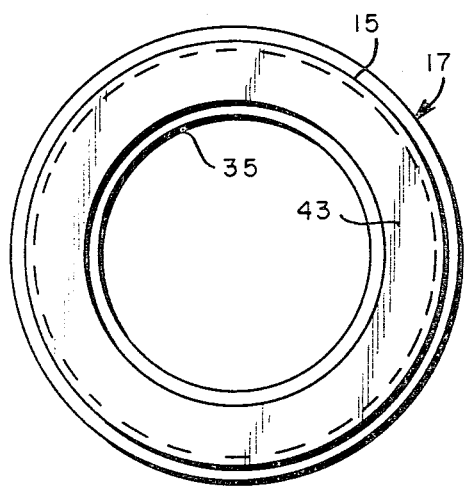
FIG. 9 is a face view of the bushing which fits on the rigid pipe and enters the body portion.

This large end of the ferrule 25 has a cylindrical portion or continuous rim 29 which is entered and seats rotatably within a metal compression ring 31, FIGS. 1, 6 and 7, of which the outside diameter fits loosely within the recess 13 of the body 1 and the stepped face engages the non-metallic sealing gasket 12 of rectangular section.

For convenience in handling, the continuous rim 29 of the ferrule 25 is made a manual press fit (−0.002″) in the compression ring 31.

Lugs 71 may be provided on the body 1 for convenience in using a pipe wrench or spanner or in manufacture. The bushing 17 is preferably knurled for the same reason.

To install the adapter, the bushing 17 is screwed firmly onto the iron pipe 21: the gasket 12 and the compression ring 31 with the ferrule 25 in place are put in the body portion 1, and this assemblage is slid over the protruding end of the tubing 7 after a peripherally grooved metallic sleeve 33 has been inserted therein. The groove 41 in this sleeve has sidewalls of unequal slope so that the groove is deeper at one of its ends than at the other. The threads on the outer end of the bushing are then engaged with by threads 14 in the body 1. Continued rotation of the body 1 seats the flanged end of the sleeve 33 against the end wall of portion 9, pushes the tubing slightly back into the rigid pipe, advances the ring 31 into seat 13, and causes the small end of ferrule 25 to enter a conical seat 35 in the end of bushing 17.

This ferrule 25 is preferably made of brass or other metal, and its walls are slotted at 37 to facilitate contraction of the major portion of its internal diameter into conical relation when it advances in the seat 35 of the bushing 17. Pushed by ring 31, the four segments 30 into which the ferrule is divided by the slots 37 are displaced progressively radially inward into such conical relation by seat 35 as the body portion 1 continues to be rotated and advanced over bushing 17, flexing at the unslotted portions 39 of the cylindrical rim 29 at the bottoms of the slots 37 as fulcra, and fold down into conical shape inside onto the tubing as they are thrust the more deeply into conical seat 35.

Thus the jaws 30 of the ferrule close onto the tubing, diverting its wall radially inward into conformity with the unequal slopes of the sidewalls of the peripheral recess 41 formed for it in sleeve 33. No material sinking of the teeth 27 into the exterior of the tubing occurs at this stage.

The advance of the body portion 1 as noted has brought the end 43 of bushing 17 into engagement with the compression ring 31 which is thereby advanced axially in contact with gasket 12, compressing it into constricted gripping contact with the tubing and sealing engagement with its seat 11 in body 1 and with the tubing 7. The degree of compression and resulting expansive energy stored in the gasket is held within safe limits by the eventual engagement of the outermost step on the face of compression ring 31 with the shoulder at the inward end of recess 13 of body 1.

It is the ring 31 that forces the jaws 30 into seat 35, thereby closing them on the tubing.

It is found in practice that only enough contractive force applied by the jaws 30 to crimp the wall of the tubing 7 inwardly to the bottom of the depression or groove 41 is needed to assure holding the tubing securely and permanently. The tapered shape in profile of this groove is that which the converging jaws 30 tend to impart to the wall of the tubing, and there is no concentration of pressure required at any location within the extensive area engaged by the jaws or the groove. But strain on the tubing which would tend to pull it from the adapter causes the tubing wall to strive to rise out of the groove 41 and resume its initial diameter in the event of any movement or stretch. Such expansion radially outward here is prevented by the chuck jaws 30, held by seat 35 from radial or axial movement, with the result of causing the teeth or serrations 27 to become imbedded firmly in the tubing wall, if of plastic.

The tubing thus rises into the serrations, and is held inescapably thereby. The grip is directly proportionate to the pull.

Thus a very low degree of torque or physical effort is required to install the novel adapter, such being predetermined by the dimensioning of the co-engaging surfaces of the ferrule, compression ring, bushing, and body, and the size of the sleeve.

A further attainment is the avoidance of all twisting of the plastic tubing in applying the adapter. The edges of the slots 37 prevent relative rotation between the ferrule and the tubing, and the ferrule is held from rotation by the seat 35 in the bushing. A dash of common saponaceous lubricant preceding assembly prevents twisting by the gasket.

The novel adapter is of course able to be applied to flexible tubing in the absence of rigid piping surrounding the tubing. The bushing 17 may be used with or without the threads within. A second pipe wrench holds this bushing while the body 1 is rotated.

While I have illustrated and described one form in which the invention may be embodied, I am aware that many modifications may be made therein by any person skilled in the art, without departing from the scope of the invention as expressed in the claims. Therefore, I do not wish to be limited to the particular form shown, or to the details or construction thereof, but What I do claim is:

1. Means for joining flexible tubing to rigid piping having in combination a sleeve to enter the tubing and having a peripheral groove with sidewalls of unequal slope and hence deeper at one of its ends than at the other, a body to receive within itself the end of the tubing and the sleeve, a ferrule in the body to surround the tubing having internally serrated segmental walls and a conical exterior, a rigid pipe through which the tubing extends, a bushing on the pipe to fold the ferrule walls inward, a gasket surrounding the tubing within the body, and a compression ring between the gasket and the ferrule to be engaged by the bushing and compress the gasket and force the ferrule to contract to crimp the wall of the tubing into the groove of the sleeve.

* * * * *